United States Patent [19]

Arnold et al.

[11] Patent Number: 5,185,872
[45] Date of Patent: Feb. 9, 1993

[54] SYSTEM FOR EXECUTING DIFFERENT CYCLE INSTRUCTIONS BY SELECTIVELY BYPASSING SCOREBOARD REGISTER AND CANCELING THE EXECUTION OF CONDITIONALLY ISSUED INSTRUCTION IF NEEDED RESOURCES ARE BUSY

[75] Inventors: James M. Arnold, Hillsboro; Glenn J. Hinton, Portland, both of Oreg.; Frank S. Smith, Chandler, Ariz.

[73] Assignee: Intel Corporation, Santa Clara, Calif.

[21] Appl. No.: 486,407

[22] Filed: Feb. 28, 1990

[51] Int. Cl.[5] .......................... G06F 9/30; G06F 9/38
[52] U.S. Cl. ................................. 395/375; 364/247;
364/264.6; 364/262.4; 364/262.8; 364/DIG. 1;
364/933; 395/800
[58] Field of Search .................. 395/325, 375, 800

[56] References Cited

U.S. PATENT DOCUMENTS

| | | | |
|---|---|---|---|
| 4,472,787 | 9/1984 | Busby | 395/325 |
| 4,493,020 | 1/1985 | Kim et al. | 395/375 |
| 4,891,753 | 1/1990 | Budde et al. | 395/375 |
| 4,903,196 | 2/1990 | Pomerene et al. | 395/375 |
| 5,073,855 | 12/1991 | Staplin et al. | 395/375 |
| 5,099,421 | 3/1992 | Buerkle et al. | 395/375 |

*Primary Examiner*—Lawrence E. Anderson
*Assistant Examiner*—Meng-Ai T. An
*Attorney, Agent, or Firm*—Owen L. Lamb

[57] ABSTRACT

A scbok line is connected to a register file and other units, such as an execution unit and a multiply/divide unit, in a data processing system. A mem scbok line is connected to the register file and other units, such as an instruction unit and a memory interface unit. Each unit connected to the scbok line can pull the line to indicate that it is busy. Each unit connected to the mem scbok line can pull the line to indicate that it is busy. The scbok line indicates, when asserted, that a unit or a register in the register file that is busy with a previous instruction is not available to an instruction for a register file operation. The mem scbok line indicates, when asserted, that a unit or a register in the register file that is busy with a previous instruction is not available to an instruction for a memory operation. Registers are checked concurrently with the issuing of an instruction. An instruction lacking any needed unit or a register is stopped in response to the asserted scbok line and reissued in the next cycle. Registers to be used by a multi-cycle instruction are marked busy for an instruction that is able to be executed. When a result for the multi-cycle instruction returns the registers previously marked busy are marked as not busy.

6 Claims, 5 Drawing Sheets

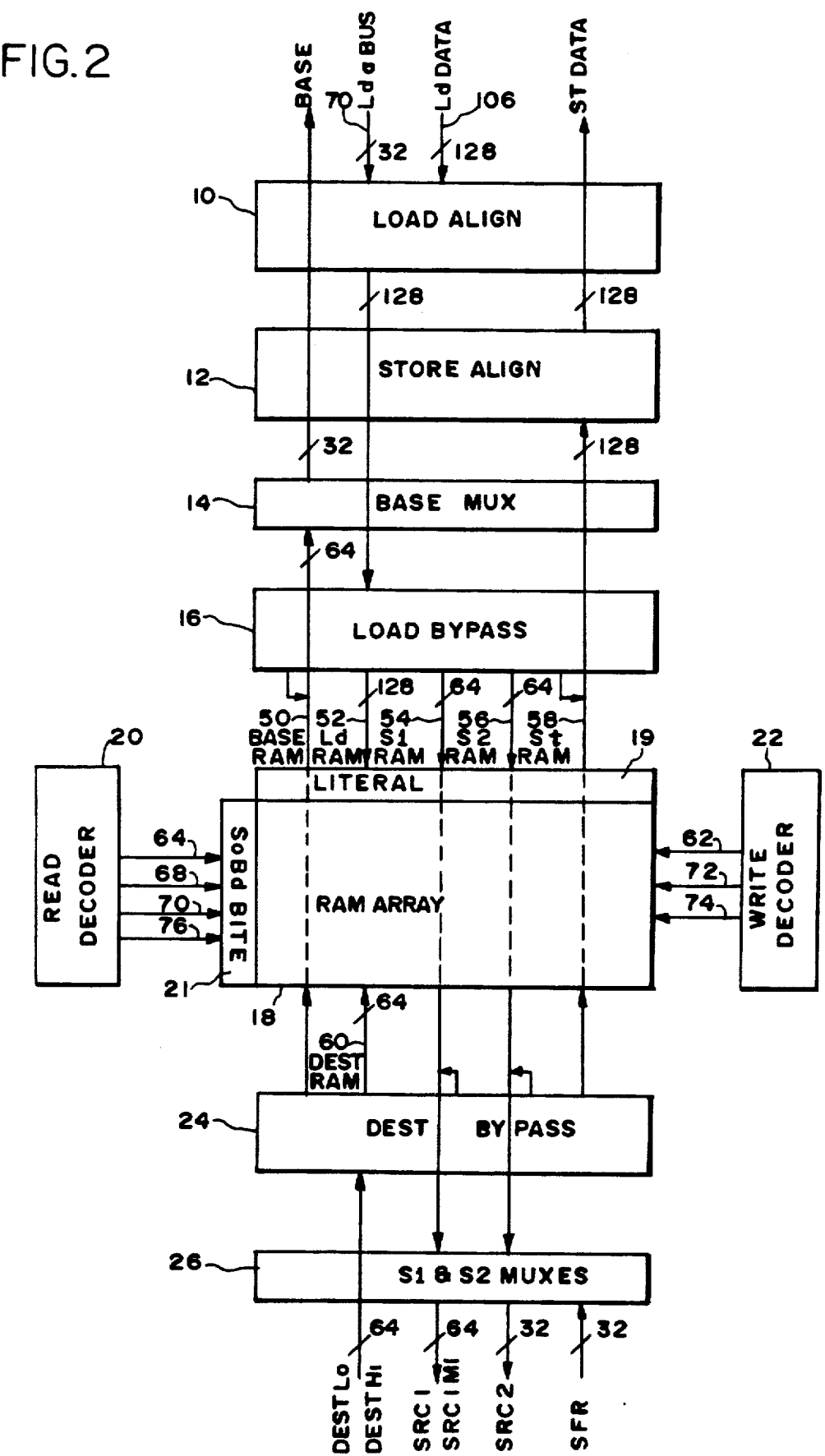

FIG.3

| | Pipe 0 | Pipe 1 | | Pipe 1 | | Pipe 2 | | Pipe 3 | |
|---|---|---|---|---|---|---|---|---|---|
| | | Ph1 | Ph2 | Ph1 | Ph2 | Ph1 | Ph2 | Ph1 | Ph2 |
| Opcode | | Add | | Add | | | | | |
| Dstadrout | | XXXXXX | | XXXXXX | | | | | |
| S1Adr, S2Adr | | XXXXXX | | XXXXXX | | | | | |
| (Read S1,S2 Scb Bits) | | | XXX | | XXX | | | | |
| Scbok | | ~~~~ | ~\_/ | ~~~~ | ~~~~ | ~~~~ | ~~~~ | ~~~~ | ~~~~ |
| | | Src1 | Busy | | OK | | | | |
| LdValid | | _____ | _____ | _/~~ | ~~~~ | ~~\_ | _____ | _____ | _____ |
| (Load Data Returns) | | | | | XXXXXX | | | | |
| (Data Written into Ram) | | | | | 0's 1's | | | | |
| Src1, Src2 | | | | | XXXXXXXXX | | | | |
| | | | | | Src1 Bypassed! | | | | |
| (Add Execution) | | | | | | XXXXXX | | | |
| Dstadrin | | | | | | XXXXXX | | | |
| Dst | | | | | | | XXXXXX | | |
| (Dest Scb Bits cleared) | | | | | | | XXX | | |
| (Dest data written) | | | | | | | 0's 1's | | |

FIG. 4

| | Pipe1 | | Pipe2 | | Pipe3 | |
|---|---|---|---|---|---|---|
| | P1 | P2 | P1 | P2 | P1 | P2 |
| Opcode and Opcode1 | XXXXXX | | | | | |
| Dstadrout | XXXXXX | | | | | |
| Src1 | | XXXXXXXXXXXX | | | | |
| Src2 | | XXXXXXXXXXXX | | | | |
| (Opcode decode) | | XXXXXX | | | | |
| Scbok (input) | | XXXXXX | | | | |
| (data path ctrl) | | XXXXXXXXXXXX | | | | |
| (instr execute) | | | XXXXXX | | | |
| (EU out latched and held) | | | XXXXXXXXXXXX | | | |
| Euwrite | | XXXXXXXXXXXX | | | | |
| Dstadrin | | | XXXXXX | | | |
| Dst | | | | XXXXXX | | |
| Euevent PROC | | | | XXXXXX | | |
| Scbok (output) | | | | XXXXXX | | |
| Cceuldq12 | | XXXXXX | | | | |
| Cceuldq22 | | | | XXXXXX | | |

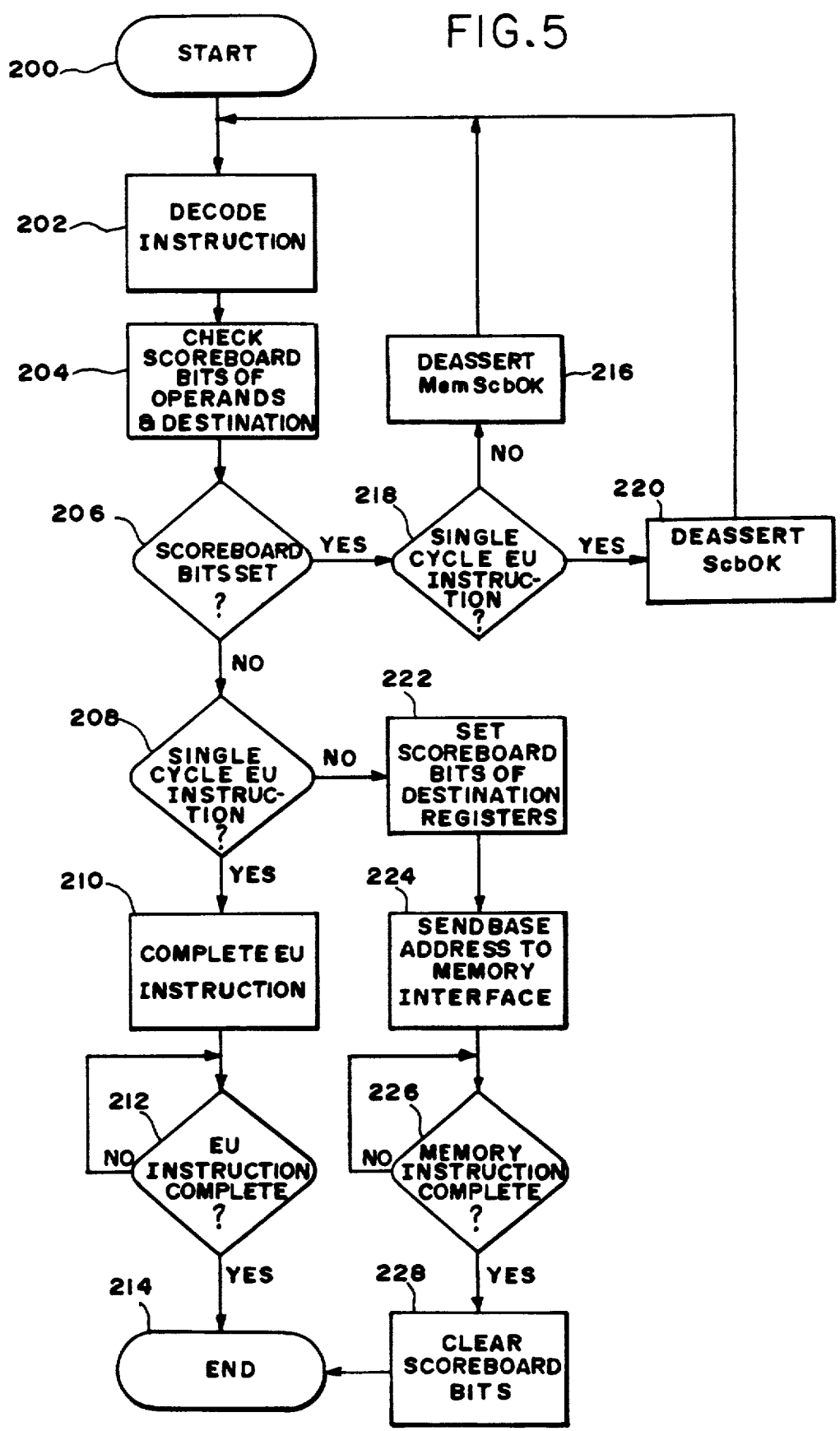

5,185,872

SYSTEM FOR EXECUTING DIFFERENT CYCLE INSTRUCTIONS BY SELECTIVELY BYPASSING SCOREBOARD REGISTER AND CANCELING THE EXECUTION OF CONDITIONALLY ISSUED INSTRUCTION IF NEEDED RESOURCES ARE BUSY

CROSS REFERENCE TO RELATED APPLICATIONS

Copending patent application Ser. No. 07/630,499, entitled "A MICROPROCESSOR IN WHICH MULTIPLE MULTI-CYCLE OPERATIONS OCCUR CONCURRENTLY; U.S. Pat. No. 5,023,844 entitled "SIX-WAY ACCESS PORTED RAM ARRAY CELL" and Copending patent application Ser. No. 07/488,254, "DATA BYPASS STRUCTURE IN A MICROPROCESSOR REGISTER FILE TO ENSURE DATA INTEGRITY", all assigned to Intel Corporation, the assignee of the present invention.

TECHNICAL FIELD

The present invention relates to data processing systems, and more particularly to apparatus for extending the capability of scoreboard bits in a register file to all multiple cycle operations when executing an instruction stream in a pipelined microprocessor.

BACKGROUND ART

In U.S. Pat. No. 4,891,753 "Register Scoreboarding on a Microprocessor Chip" by David Budde, et al., granted on Jan. 2, 1990 and assigned to Intel Corporation, there is described apparatus for minimizing idle time when executing an instruction stream in a pipelined microprocessor by using a scoreboarding technique. A microinstruction is placed on a microinstruction bus and a microinstruction valid line is asserted. When a load microinstruction is decoded, a read operation is sent to a bus control logic, the destination register is marked as busy, and execution proceeds to the next current microinstruction. The marking provides an indication as to whether a current instruction can be executed without interfering with the completion of a previous instruction. The marking of registers gives rise to the term "scoreboarding". Execution of the current microinstruction proceeds provided that its source and destination registers are not marked "busy"; otherwise the microinstruction valid line is unasserted immediately after the current microinstruction appears on the microinstruction bus. The current microinstruction is thereby canceled must then be reissued. When data is returned as the result of a read operation, the destination registers are marked as "not busy".

It is an object of this invention to extend this prior scoreboarding technique to encompass all multiple cycle operations in addition to the load instruction.

BRIEF DESCRIPTION OF THE INVENTION

The above object is accomplished in accordance with the invention by providing a method and means for driving a Scbok line to signal that a current microinstruction on a microinstruction bus is valid. Information is then driven on the machine bus during the first phase of a clock cycle. The source operands needed by the instruction are read during the second phase of said a clock cycle. The resources needed by said operands to execute the instruction are checked to see if they are all available. The Scbok signal is asserted upon the condition that any one resource needed by the instruction is busy. Means are provided to cause all resources to cancel any work done with respect to executing said instruction to thereby make it appear to the rest of the system that the instruction never was issued. The instruction is then reissued during the next clock cycle.

DESCRIPTION OF THE DRAWINGS

The foregoing and other objects, features, and advantages of the invention will be apparent from the following more particular description of a preferred embodiment of the invention as illustrated in the accompanying drawings.

FIG. 2 is a more detailed block diagram of the register file (6) of FIG. 1;

FIG. 3 is a timing diagram of scoreboarding operations with respect to the register file;

FIG. 4 is a timing diagram of scoreboarding operations with respect to the execution unit; and, FIG. 5 is a flow chart of the logic within the register file of FIG. 2 for performing the scoreboarding operations.

DESCRIPTION OF THE PREFERRED EMBODIMENTS

Figure 1:
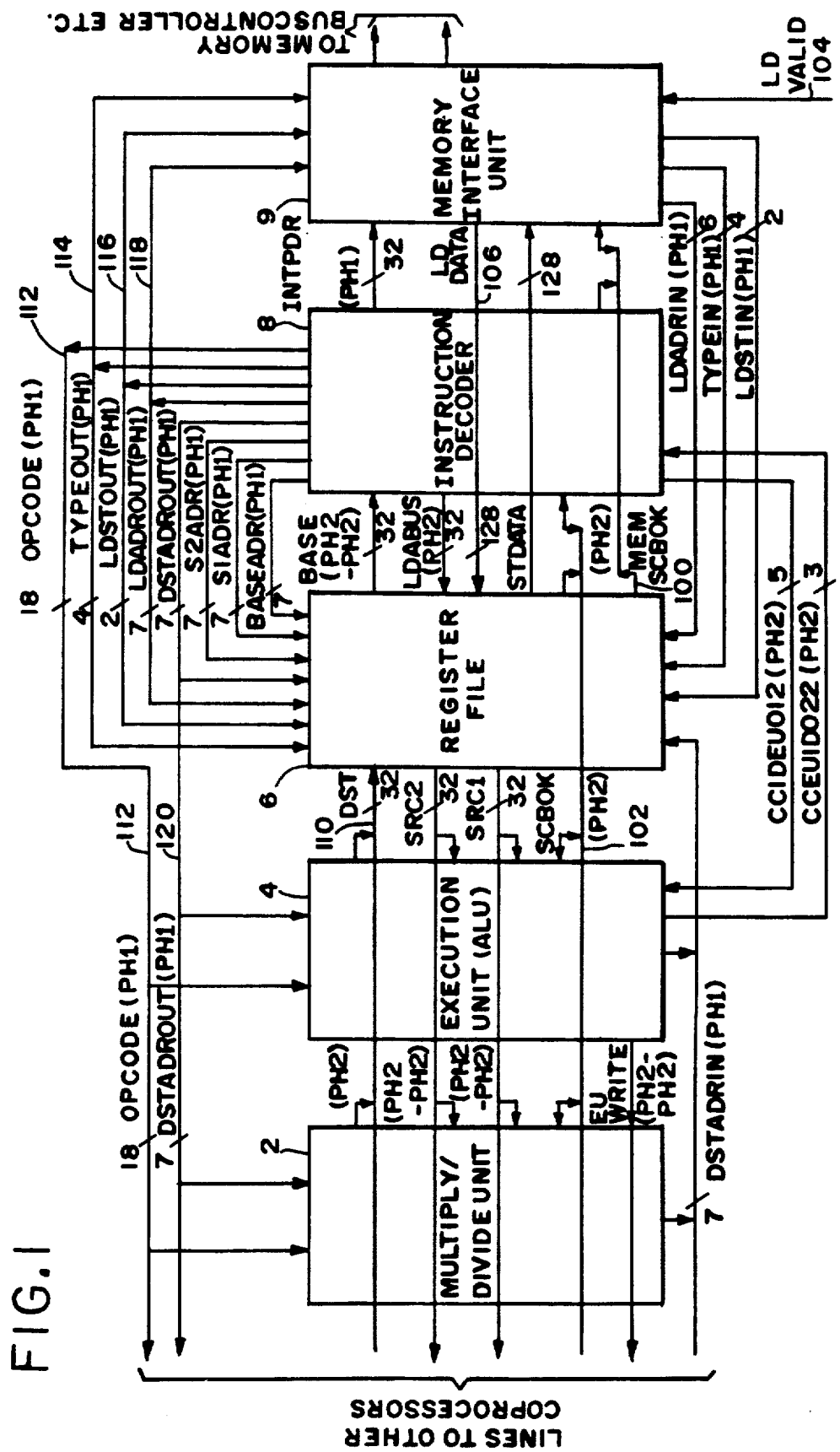
FIG. 1 is a functional block diagram of each of the major components of the microprocessor in which the invention is embodied.

Referring now to FIG. 1, the microprocessor is logically subdivided into five major units: the Multiply/Divide unit (2), the Execution Unit (4), the register file (6), the Instruction Decoder (8), and the Memory Interface Unit (9). Each of the units is described briefly below.

Instruction Decoder (8)

The Instruction Decoder (8) includes an Instruction Cache, instruction sequencer (IS), and ROM (I-Cache). The I-cache provides the Instruction Sequencer with instructions every cycle. It contains a 2-way set-associative instruction cache and a microcode ROM. The I-Cache and ROM are essentially one structure. The ROM is an always-hit portion of the cache. This allows it to share the same logic as the instruction cache —even the column lines in the array. The I-Cache is four words wide and is capable of supplying four words per clock to the Instruction Sequencer (IS). It consistently supplies three or four words per clock regardless of the alignment of the instruction address. The I-Cache also contains the external fetch handling logic that is used when an instruction fetch misses the I-Cache.

The Instruction Sequencer (IS) decodes the incoming four instruction words from the I-Cache. It can decode and issue up to three instructions per clock but it can never issue more than four instructions in two clocks. The IS detects dependencies between the instructions and issues as many instructions as it can per clock. The IS directly executes branches. It also vectors into microcode for the few instructions that need microcode and also to handle interrupts and faults.

Register File (6)

The register file (RF) has 16 local and 16 global registers. It has a small number of scratch registers used only by microcode It also creates the 32 literals (0–31 constants) specified by the architecture. The RF has 4 independent read ports and 2 independent write ports to support the machine parallelism. It also checks and maintains the register scoreboarding logic.

Execution Unit (EU-12)

The EU performs all the simple integer and ordinal operations of the microprocessor in which the present invention is embodied. All operations take a single cycle. It has a 32-bit carry-look-ahead adder, a boolean logic unit, a 32-bit barrel shifter, a comparator, and condition code logic.

Multiply-Divide Unit (MDU-10)

The MDU performs the integer/ordinal multiply, divide, remainder, and modulo operations. It performs an 8-bit-per clock multiply and a 1 bit-per-clock divide. A multiply has 4 clock throughput and 5 clock latency and a divide has 37 clock throughput and 38 clock latency.

Memory Interface Unit (9)

The Memory Interface Unit (9) includes an Address Generation Unit (AGU) and a Local Register Cache (LRC). The AGU does the effective address calculations in parallel with the integer execution unit. It performs the load-effective-address instructions (LDA) and also does the address computations for loads and stores. It has a 32-bit carry-look-ahead adder and a shifter in front of the adder to do the prescaling for the scaled index addressing modes.

The Local Register Cache (LRC) maintains a stack of multiple 16-word local register sets. On each call the 16 local registers are transferred from the register file (RF) to the LRC. This allocates the 16 local registers in the RF for the called procedure. On a return the 16 words are transferred back into the RF to the calling procedure. The LRC uses a single ported RAM cell that is much smaller than the 6-ported RF cell. This keeps the RF small and fast so it can operate at a high frequency while allowing 8+ sets of local registers to be cached on-chip. With this LRC the call and return instructions take 4 clocks.

Instruction Set

The instruction set of the microprocessor is similar in design to those of RISC (reduced instruction-set computer) machines All instructions are 32-bits in length and must be aligned on word boundaries, and only load, store, and branching instructions reference memory (all others reference registers located on the chip). Since the most-often used instructions are executed in one cycle, instruction decoding is also done in one cycle, and, via pipelining, allows the processor to sustain an instruction-per-cycle processing rate.

Most instructions have the REG format, which specifies an opcode and three registers/literals (i.e., one of 32 registers, or a constant value in the range 0-31). The COBR format is for a set of compare-and-branch instructions. The CTRL format covers branch and call instructions. The MEM formats are for load and store instructions. The formats are shown below.

REG FORMAT

| opcode | src/dst | source_2 | m3 | m2 | m1 | opcode | XXX | source_1 |
|--------|---------|----------|----|----|----|--------|-----|----------|
| 8 | 5 | 5 | 1 | 1 | 1 | 4 | 2 | 5 |

COBR FORMAT

| opcode | source_1 | source_2 | m1 | displacement |
|--------|----------|----------|----|--------------|
| 8 | 5 | 5 | 1 | 13 |

CTRL FORMAT

| opcode | displacement |
|--------|--------------|
| 8 | 24 |

MEM FORMAT

| opcode | src/dst | abase | md | 0 | offset |
|--------|---------|-------|----|---|--------|
| 8 | 5 | 5 | 1 | 1 | 12 |

The instruction set includes conventional instructions such as add, multiply, shift, and branch.

Register Model

At any point in time, thirty-two 32-bit registers and four 80-bit floating-point registers are addressable (the 32 registers can also be used to hold floating-point values). Of the 32 registers, 16 are global registers (21) and 16 are local registers. The difference is that the 16 global registers are unaffected when crossing procedure boundaries (i.e., they behave like "normal" registers in other architectures), but the local registers are affected by the call and return instructions.

When a call instruction is executed, the processor allocates to the called procedure a new set of 16 local registers from an on-chip pool of register sets. If the processor's fourset pool is depleted, the processor automatically reallocates a register set by taking one register set associated with an earlier procedure and saving the contents of that register set in memory. The contents of the earlier procedure's register set are saved in the first 16 words of that procedure's stack frame in memory. The return instruction causes the current local register set to be freed (for use by a subsequent call). This mechanism is called the stack frame cache (23) and is more fully described in U.S. Pat. No. 4,811,208 of Meyers et al., entitled "Stack Frame Cache on a Microprocessor Chip" granted on March 7, 1989, and assigned to Intel Corporation, the assignee of the present invention.

Register Scoreboarding

The circuit of FIG. 1 is driven by a clock having a two non-overlapping clock phase design such as the clock described in U.S. Pat. No. 4,816,700. Four clocks, PHI, PHII, PH2, PH2I, are distributed in the chip. PHI and PH2 are traditional NMOS non-overlapping clocks with equal duty cycles. PHII and PH2I are the PMOS analogs to PH1 and PH2 and are exact inversions of PH1 and PH2 respectively. Successive PH1 and PH2 assertions form a microcycle.

Overview of the Register File

The Register File (RF) is the focal point for all data operands in the Microprocessor. The Microprocessor has a LOAD/STORE architecture; all data operands (excluding special function register operands) associated with a program must at one time or another reside in the RF. The RF contains the macrocode and microcode visible RAM registers. The RF provides a high performance interface to these registers through a multi-ported access structure, allowing four reads and two writes to occur the same machine cycle on different registers. Along with the duty of fulfilling register accesses, the RF is responsible for the following functions:

(1) creates 32 literals for the use of the programmer/microprogrammer.

(2) performs partial alignment of loads and stores. performs zero and sign extension of byte and short word loads.

(3) checks and reports Integer Overflow (IOV) faults on byte and short word integer stores.

(4) maintains register integrity through the use of a scoreboard bit attached to each register.

(5) incorporates a bypass structure that drives the correct source data from an immediately previous write result to guarantee the most recent data is utilized.

Referring now to FIG. 2, the Register File consists of six major logic blocks: The Load/Store Alignment (10, 12), the Base Mux (14), the Load Bypass 16 ), the Ram Array (18), the Destination Bypass (24), and the Src1/Src2 Muxes (26).

The table I shows the register set and their addresses supported by the RF.

TABLE I

| Register Set | | Register Address |
|---|---|---|
| 16 Frame Registers | R0-R15 | 000XXXX |
| 16 Global Registers | G0-G15 | 001XXXX |
| 32 Literals | 0 ... 31 | 01XXXXX |
| 32 Special Function | SF0-SF31 | 10XXXXX |
| 32 Scratch Registers | S0-S31 | 11XXXXX |

Special Function Registers (SFR) are not resident inside the Register File, but are found in the external logic. Liter-Register als do not actually reside in registers inside the RF, but are created using the register address of the literal value. The Literal creation logic is explained further in the Ram Array logic block description.

Up to 32 scratch registers may be physically created in the RF. The scratch registers are only seen by microcode, and are never directly seen by the macro level programmer. In the present embodiment, four of the 32 possible registers are provided, bringing the total register count to 36 (16 global +16 frame +4 scratch).

There are 4 reads possible : Store, Base,Src1 and Src2. Similarly there are 2 writes possible: Load and Destination.

The entire data path including the actual ram array (18), is structured into a 4 word ×32 bits/word 128-bit wide path, arranged with word bits grouped together (Word 3 bit 31 Word 2 bit 31, Word 1 bit 31, etc.). This arrangement provides advantages in both ram cell width size and ease of alignment of Load/Store data.

Since the both register and memory types of instructions allowed to execute in the same cycle, six possible register requests could be executing. Thus, a 6-port register file design is required to correctly implement these parallel functions. Of course, a mechanism must exist that prevents the collision of data, since writing the same register from multiple sources could be disastrous. To protect against this problem, and to prevent data from being read before it is properly written, the RF uses register scoreboarding. Consider the following example:

LD (G0), G1; This loads 1 word into G1 using G0 as the; base address.

ADD G1, G2, G3; This adds G1 and G2,placing the result in G3.

The Load in this example uses G1 as the destination, and the next cycle, the ADD uses G1 as Src1. Without register scoreboarding, the Load would execute, sending the address from G0 to the Memory Interface (9). The Add would blindly use G1 for Src1 and place the result, though incorrect, into G3. To avoid erroneous results, the Add is held up until the data can be returned from the Memory Interface. The method used by the RF is to include a scoreboard bit (21) associated with each register in the array (19) that is checked at the beginning of every instruction, assuring that valid data is always used. Seeing that its operands and destination are not in use, the RF sets the scoreboard (Scb) bits associated with the destination register(s), and allows the instruction to complete. In the above example, the Load is issued by the instruction sequencer (IS) within the ID (8), the RF checks G0 and G1's scb bits, the signal MemScbOK (200) is kept asserted, and the Base (50) is sent to the Memory Interface (9). The ADD is also issued by the IS. The RF checks G1,G2 and G3, with G1 being found to be busy. The RF then asserts Scbok (102) low, indicating to the IS that the necessary resources are not available, and that it should reissue the ADD. The IS keeps reissuing the ADD, with the RF asserting Scbok (102) low until the Load completes and the scoreboard bit associated with G1 is cleared, allowing the ADD to complete. FIG. 3 shows the basic timings for reading and writing the RAM Array, and checking and setting the scoreboard bits.

In the above example, the Load data is returned after an arbitrary number of cycles. Note that the signal LdValid (104) is asserted, indicating that valid data is on the LdData bus (106). Registers in the Ram Array are read in Ph2, and written in Ph1. When the Load data is written into the register file, the following occurs. In q02 (Pipe Stage 0, Phase 2), the zeros of the data are written into the RAM, with the ones written just following in q11. Since 0's cannot overwrite 1's in this implementation, the registers to be written must be cleared just previous to the actual writing of the data. This is due to the structure of the ram cell implemented in the RF as described in copending application U.S. Pat. No. 5,023,844.

The Add instructions, destination register is not scoreboarded. All EU type of instructions are not scoreboarded by the Register File. There are certain types of EU instructions, namely Compare instructions, that do not return a destination to the RF, thus causing problems for the scoreboarding clearing mechanism. The Register File could go through the process of decoding all types of Compare instructions, and make the special case of not scoreboarding the destination register specified in the instruction field. However, since all EU instructions always execute in one cycle, there is no need to scoreboard these instruction's destination registers; the data will be ready for a following instruction that requires the particular register for its source. The decoding needed for determining EU instructions is minimal: 3 bits of the Opcode field.

Referring to the previous example, the Load data is returned in q02 but is actually written into the Ram Array in q11. To avoid the Add instruction from being delayed one cycle waiting for the data to be written into the ram, and then read out again, the RF bypasses the returning Load data onto the Src1 bus during q02. The Load data is written as usual in q11, as the Add executes in the EU. The bypass mechanisms are more fully described in copending application. Ser. No. 07/488,254.

RF Logic block Descriptions

The RF (6) is divided into six major logic blocks, which will now be described with reference to FIG. 2.

Load/Store Alignment

The Load and Store Alignment logic block (10, 12) arranges the data destined for the Memory Interface (in the Load case) and prepares the data coming from the Memory Interface to be entered into the Ram Array (in the Store case). Since the procedure is almost identical for both cases with just the direction reversed, the Load alignment process only is described.

Load data returning from the Memory Interface is arranged such that it has been word aligned to the least significant word (LSW), which is Word 0. For example, a word returning from Word2 in a 4 word memory block is shifted to Word0 before it is placed on the LdData bus. Note that just as the RF data path is structured as a 4 Word ×32 bits/word path with word bits grouped together (all bit zeros together, all bit ones, etc.), the LdData and Stdata busses also are structured this way. Thus, a word shift to Word0 is simply a multiplexing process in each bit cell. Since only partial word alignment is done by the Memory Interface, sub-word (byte and short word) cases are identical to a word access from the point of view of the Memory Interface. For example, a byte returning from Byte 13 of the 16 (0-15) byte memory block would return in Word3,bits 8-15. The Memory Interface would then align this to the LSW, or Word0, though the byte would still be in bits 8-15.

The first step the RF Load alignment logic block does is correctly byte align the incoming data to the least significant byte (LSB). This only has to be done if the returning data is a sub-word quantity. The RF determines this from the TypeIn field which is returned a phase earlier than the data. The following table shows the bit format and their meanings for the TypeIn field.

TABLE II

| Type of Load Data | TypeIn(3:0) |
|---|---|
| Byte with Zero extension | 0000 |
| Byte with Sign extension | 1000 |
| Short with Zero extension | 0001 |
| Short with Sign extension | 1001 |
| Word | X010 |
| Long Word | X011 |
| Extended Word | X100 |
| Quad Word | X110 |

Byte aligning the incoming data requires a physical moving of the data to the lowest byte, an actual "steering" of the data perpendicular to the data path of the RF. The Load/Store alignment uses two tri-state 8-bit "byte-busses", one for byte cases and an additional one for short word cases, to move the data across the data path. Note that the driving of this distributed bus is only done by Word0, since the word alignment has already been done by the Memory Interface. Each byte of Word0 has drivers with separate control, such that only one byte can drive the bus at a time. The control for this mechanism is derived from the TypeIn field and from a new field, MemAdrIn(0:1). This field,driven by the Memory Interface, conveys the byte location in the original word of external memory which is now in Word0. At this point,the entire data destined for the Register File has been completely aligned to the LSB.

Zero extension or sign extension is now done for the Load case. This is unique to the Load Alignment block; Stores do not have to do these operations. If the data returning from memory is a byte or short word, and bit 3 of the TypeIn field is zero, then zero extension must be performed to pad the rest of the 32 bit word to be written to a register. Similarly, if data is byte or short word and bit 3 or TypeIn is a "1" then sign extension is done. This is simply forcing the upper bits (bits 8-31 for byte bits 16-31 for Short Words) to the value of the sign bit (bit 7 for bytes, bit 15 for Short words).

The final step involved is register alignment, which correctly positions the word(s) into their intended word locations, which will then be written into the Ram Array. Sign extension is also done at this step if the data type is byte or short word. Sign extension involves extending the value of bit7 (or bit15 for short word) through bit31, which maintains the correct sign for the integer word. The task of sign extension and word alignment, which due to the bit grouping of the RF data path arrangement does not require a data path move, is performed by 4 multiplexers (1 for each word). Control for these mux'es is derived from the TypeIn field representing the length of the data and the type of extension (sign or zero) for sub-word cases, and from the lower two bits of the register address.

The Store Alignment block has the additional responsibility of checking and reporting integer overflow (IOV) faults on byte and short word integer stores. Overflow is detected by checking the upper bits beyond the length of the data (bytes: bits 8-31,short : bits 16-31), making sure that the bits are all identical to the sign bit (bit 7 for bytes, bit 15 for short word). If the upper bits are not identical, an IOV fault is signaled by asserting the IOVFlt signal, which is sent to the Core interface. The external Core interrupt and fault controller will then handle the fault.

Base Mux

The Base Mux (14) contains a 2-1 multiplexer that reduces the 64-bit field coming from the Ram Array into a 32-bit Base suitable for the Memory Interface. The base mux is needed to handle the Ram Array 64-bit Base bus (50). This also saves area in the Ram Array which would have had to further multiplex the 64-bit value into a 32-bit base. The multiplexer is controlled by bit 0 of the BasAdr bus, which specifies which word to allow on to the Base.

Load Bypass

The Load Bypass logic block (16) contains the logic to bypass the LdData bus (106) returning from the Memory Interface (9) onto the various outgoing ports: StData (58), Base (50), Src1 (54), and Src2 (56).

The basic mechanism used to perform a Load bypass function works as follows. The register addresses of all the registers in which data is returning are compared with the addresses of the source registers requested. When a match has been made, the bypass logic places the data coming in from the Load alignment logic block directly onto the source's ram column lines. From the point of view of the Src busses, the data has been read from the actual Ram Array; no differences can be detected.

This method of driving the column lines is possible because the registers which are being bypassed have been cleared immediately prior the column lines being driven. If it were not for this fact, the stale contents of the registers would be driven onto the column lines, since the decode logic is still enabling the ram cells to drive their data. The column lines are precharged negative true, which means that zeros in the cell do not affect the state of the lines.

Ram Array

The Ram Array logic block (18) contains the Literal generation logic (19), the Register Ram Array with address decoders, and the register scoreboard bits (21).

The Register File provides 32 literals, values 0 through 31, for the use of the programmer/microprogrammer. The Literal logic which produces these values resides just on top of the Ram Array, with the ram column lines traveling through the section, continuing to the Load Bypass logic block (16). When a literal is requested as a Src1 or Src2 operand (literals are not allowed as sources for Base and Store use), its corresponding "register address" is places on the S1Adr or S2Adr busses. Referring to TABLE I, notice that the address of literals is 0100000–0111111, which represent 0-31. Literals are created by simply mu'xing the lower five bits of the register address onto the respective source ram column lines, which are sent to the proper logic to produce the Src1 and Src2 busses. The upper 27 bits of the word remain undriven, since the column lines are precharged and are negative true. This produces the zeros needed on the upper bits, forming a 32 bit value.

The Ram Array entails a 9 row ×4 32-bit word register ram, which houses the 36 registers used by the processor. These 36 registers include 16 global registers, 16 frame (local) registers, and 4 microcode scratch registers. As mentioned previously, the four registers per row are arranged with like word bits grouped together. For example, at the far left the bits coming out of the Ram Array from left to right would be Word3 - bit31, Word1 - bit31, Word0 - bit31, Word2 - bit31, and then the next bit, Word3 - bit30, etc. This can be visualized as all four registers stacked one on top of the other, with LSB's on the same end.

This ordering of the words (3-1-0-2) minimizes the RAM cell size. Since Long Words (64-bit), must come only from register pairs 0 and 1 or pairs 2 and 3, the Dst bus (110), the Src1 bus and the Src2 bus will never drive or receive data simultaneously from words 3 and 1, or words 0 and 2. Thus, these ports' column lines can be shared with each other, saving pitch size of the ram cell. The RAM cell per se is described in copending application U.S. Pat. No. 5,023,844

The Ram Array stores the scoreboard bits which are associated with each register. The bit cells are almost identical to the regular ram cell with one exception. An additional read port is needed for these bits because the (destination) register's scoreboard bit must be read at the same time as the source register's scoreboard bit to insure that destination updates are performed in the appropriate order. The CLEAR line's additional function is to clear the scoreboard bit when the register is finally written.

Destination Bypass

The Destination Bypass logic block (26) contains the circuitry to bypass the Dst bus (110) returning from the EU or REG coprocessors onto the various outgoing ports: StData (58), Base (50), Src1 (54), and Src2 (56). The Destination bypass is virtually identical to the Load bypass mechanism with some minor differences. The logic is actually simpler in the Destination bypass because only two registers can possibly be bypassed, since the Dst bus is only 64-bits wide. In the Load bypass, the register address comparison logic has to handle the possibility of four registers being bypassed since the LdData bus is 128-bits wide. Other than these differences, the logic is almost identical to the Load bypass circuitry.

Src1 and Src2 Muxes

The Src1 and Src2 Muxes (26) contain the multiplexers needed to select either one of the two word 64-bit source ram data, or the SFRInBus to drive the 32-bit operand for the Src1 and Src2 busses. The logic block also contains the buffers that drive the Src1Hi bus, providing a full 64-bit source when needed. The control necessary to multiplex the three possible sources into a single word Src operand is the LSB of the S1Adr (or S2Adr) along with the LdStIn field which tells the logic when to enable the SFRInBus.

The Src1Hi bus and the Src2Hi bus are driven without regard to whether or not the data is required by the EU or REG coprocessors.

External Interfaces

The following is a general description of the major busses and signals that connect the RF (6) to the other logic blocks shown in FIG. 1..

Memory Interface Busses

The following busses carry actual data to and from the RF.

LdData(0:127): This is the 128-bit Load Data bus which returns the information from the Memory Interface (External Memory, Data Cache, etc.).

StData(0:127): This is the 128-bit Store Data bus which sends information to the Memory Interface.

Base(0:31): The Base bus is the 32-bit base address bus sent to the Memory Interface specifying the memory address of the Load or Store.

LdaBus(0:31): This is the 32-bit Load Effective Address bus sent by the instruction Sequencer (IS) to be stored in a register.

The following busses carry control and register address information, specifying type and location information about the above data busses. All register addresses are 7 bits.

BasAdr: This is the address of the register to be used to drive the Base bus.

LdAdrOut: The Load Address Out bus is used in several cases. It is sent to the RF along with the opcode by the IS specifying the starting register (i.e. G0 on a quad word access) to be scoreboarded on a Load instruction. It is also used to specify the starting register to be sent on the StData bus on a Store instruction. Finally, it contains the address of the register to be scoreboarded on a LDA (Load Effective Address) instruction.

LdAdrIn: This is the register address of the Load or LDA data returning from the Memory Interface or IS. It is driven when the data is ready to return to the Core.

TypeOut(0:3): This 4-bit field specifies the length and type of extension used for sub-word accesses. It is driven by the IS along with the opcode and LdAdrOut bus. It is used to determine which registers to scoreboard (and check) on Loads, and which registers to drive the StData bus on Stores.

TypeIn(0:3): This is the TypeOut field which has been trapped by the Memory Interface, waiting for the data to return, be it from the Data Cache or external memory. It is returned along with the LdAdrIn bus.

LdStOut(0:3): This determines which flavor of memory operation is requested: Load, LDA, Store, or instruction fetch. It is sent along with the TypeIn and LdAdrIn fields.

LdStIn(0:3): This is the LdStOut field sent back by the Memory Interface (on loads) or the IS (on LDA,s). It is returned along with the TypeIn and LdAdrIn fields.

LdVadid: This signal driven by the Memory Interface is asserted when valid data is placed on the LdData bus.

MemScbok: This signal driven by the R.F. indicates to the rest of the logic blocks that a register used by the current memory type instruction is not free, and that the instruction must be reissued when the register is not in use. It is analogous to the Scbok signal described below.

Register Execution Busses

The following busses carry data to and from the RF.

Src1Hi, Src1: These two 32-bit busses form the 64-bit source operand #1 which is sent to the EU and coprocessors.

Src2Hi, Src2: These two 32-bit busses form the 64-bit source operand #2 which is sent to the EU and coprocessors.

DstHi#, DstLo#: This constitutes the 64-bit destination bus which the EU and coprocessors use to return the result of the operation performed. Both busses are negative true.

SFRInBus(0:31): This is the 32-bit Special Function Register bus which allows external Core logic functions to be read as if they were registers. The RF allows the SFRInBus to drive the Src1 or Src2 busses when the register address field matches a SFR register address.

The following busses carry register address information to and from the RF. Each are 7 bits.

S1Adr: This is the address of the register(s) used to drive the Src1 bus.

S2Adr: This specifies the address of the register(s) used to drive the Src2 bus.

DstAdrOut: This is the address of the registers that will be used to store the destination of the operation to be performed. It is used by the RF to scoreboard (and check) the appropriate registers.

DstAdrIn: This is the register address for the data returning on the DstHi and DstLo busses.

Scbok: This signal indicates when asserted that a resource is not available for the Register Execution operation. A resource could be a register which is in use by another operation or an entire unit (EU, DSP coprocessor, etc.) is busy.

Scoreboarding Operation Description

FIG. 5 is a flow diagram of the scoreboarding operation. Each instruction needs to use certain resources to execute. A resource might be a register, a particular functional unit, or even a bus. If any instruction being issued is lacking any needed resource then it must be stopped.

During the second pipe stage shown in FIG. 3, the resources are checked concurrently with the issuing and beginning of the instructions so this does not slow down the operating frequency. Each instruction is conditionally canceled by asserting Scbok line (102) if the instruction is a register type instruction involving REG coprocessors (resources) or the Mem Scbok line (100) if the instruction is a memory type instruction involving MEM coprocessors (resources). The instruction is reissued depending on the resource check for that instruction. Since the instruction set is simple and regular this check is quite easy. Register Scoreboarding sets the destination register or registers busy once it passes the resource check mentioned above. When the result returns whether 1 or many cycles later the resultant register gets cleared, marked as not busy and free to use. Each multi-cycle functional unit maintains a busy signal that is used to delay a new instruction that needs to use this busy unit.

When an instruction is issued several things happen. The Scbok signal is asserted. The information is driven on the machine bus during q11. Then during q12 the source operands are read and the resources needed to execute the instruction are checked to see if they are all available. If they are all available then the ScbOk signal is left asserted and the instruction is officially issued. If any resource needed by the instruction is busy (reserved by a previous incomplete instruction or full because already working on as much as it can handle) then the ScbOk signal is deasserted by pulling it low. This tells any unit looking at that instruction to cancel any work done; thus making it appear to the rest of the system that the instruction never was issued. The IS will then attempt to reissue the instruction on the next clock and the same sequence of events will repeat.

If the instruction address is not in the instruction cache when it is checked during q02 if there is a cache miss then the fetch logic issues a fetch on MEM side of machine during q11. This fetch looks just like a normal quad word load except the destination of the fetch is the Instruction Sequencer rather than the Register File.

Pipe2 —Computation stage and return stage During this stage the computation is begun (and completed in one phase if it is a simple ALU operation). If the operation is a long one (takes more than 1 clock) then the result or destination register(s) must be marked as busy so a subsequent operation needing that specific register resource will be delayed until this long operation is completed. This is called scoreboarding the register. There is one bit per 32-bit register called the scoreboard bit that is used to mark it busy if a long instruction. This scoreboard bit is what is checked during q12 (read this 33rd bit as reading rest of register).

If the operation is a simple ALU type operation then the result is computed during q21 and returned to the register file during q22. As the data is written to the destination register the scoreboard bit is cleared marking the register available for use by another instruction.

Coprocessors are additional and possibly concurrent processors of information. They receive instructions from the instruction stream and operands from the Register File, they compute some result or do some function, and they usually return some result.

To describe the function more clearly the MDU or Multiply/Divide Unit will be used as an example. It accepts instructions of the REG format (just like add or subtract). It takes multiple cycles to complete its operation. It looks identical to an add in pipeline stage 0 and 1 —in fact the IS and RF do not know the difference. Its opcode matches a range that the MDU understands so it grabs it and begins work on it. During the beginning of q21 the destination register is marked busy by setting its scoreboard bit to a one. The MDU's pipe stage 2, pipe2, is its computational stage. It lasts multiple clocks. As it is computing this result other operations that do not need to use this result can be issued. This often allows part or all of the long operations to be hidden by other computations. When the MDU completes its work it returns the result to the Register File during Pipe3. The MDU must arbitrate to use the destination bus that returns the result back to the register file. If it wins the arbitration it can write data back the NEXT destination bus cycle. It should try to do this arbitration one clock before it completes its operation so it can return the results just as it completes the computation. It must also return the destination register specifier to tell the RF where to put the result —only the coprocessor keeps track of where the result goes.

Thus a typical coprocessor has 3 phases of operation that it sees: 1) the issue or emitting phase —where resources are checked and sources driven, 2) the computation phase, and 3) the return phase. (There is a Pipe0 stage also in the IS that 'gets' the instruction but the coprocessors do not see this).

Single vs Multi-cycle coprocessors

There are two different classes of coprocessors. One is the single-cycle coprocessors such as the Execution Unit. It both computes and returns the results during pipe stage 2. The other is the multi-cycle coprocessors such as the Multiply/Divide Unit. In order to help keep the single-cycle coprocessors as simple as possible they never really arbitrate for the return path to the Register File. They blindly get it as long as none of their resources are scoreboarded. Since only one operation can be emitted at a time on each part of the machine bus there is never a collision between the single-cycle coprocessors. The multi-cycle coprocessors that want to return a result must first check to see if a single-cycle instruction is going to use the return path. If so the multi-cycle coprocessor must wait. If not the multi-cycle coprocessor must arbitrate with the other multi-cycle coprocessors to see who gets to return the results. This arbitration is done one full clock before the data is actually returned to the RF. With this mechanism other single-cycle coprocessors could be added to the P10 core and work just as easily as the EU and take a single clock. Also as many multi-cycle coprocessors can be added as needed and only the arbitration logic needs to be changed —everything else is taken care of.

The coprocessors mentioned above are all REG Format coprocessors —they execute on the REG portion of the machine bus. There are also MEM Format coprocessors that work off the MEM portion of the machine bus. Thus, the Scbok line (102) is connected to and controls REG coprocessors and the Mem Scbok line (100) is connected to and controls MEM coprocessors. Both type of coprocessors can be single or multi-cycle. A RAM is sort of a single-cycle coprocessor and a Bus controller is a multi-cycle one. A DMA or MMU are other examples of MEM coprocessors.

All these coprocessors follow the same rules —the instructions they receive from the IS are issued during q11, the resources are checked and the source operands are driven during q12, the resources used are marked busy during q21. They then either do the computation or complete the access requested. When this completes they must arbitrate among themselves to return the results to the Register File (except the single-cycle coprocessors who blindly get to return their results). Part of returning the results also includes returning the destination register address so the RF knows where to put the result.

Signal Descriptions

Data Buses

There are 3 data buses on the coprocessor side of the microprocessor —the source1 bus (Src1H/Src1 —64 bits), the source2 bus (Src2H/Src2 - 64 bits), and the destination bus (Dsthi/Dstlo —64 bits). All coprocessors receive operands from the Register File (RF) or SFR's only and return results to the RF or SFR,s only. Source1/Source2 are the input buses which drive data from the RF to all the coprocessors. Destination is the precharged bus used by the coprocessors to return results to the RF. All coprocessors hook to these buses; however, the EU in most cases only uses the lower 32 bits of these three buses. Only in the "movl" instruction does the EU use as input the high 32 bits of Source1. Only in the "movl" and "mov-add-64" instructions does it drive the high 32 bits of the Destination bus.

Address Buses

All coprocessors hook to two address buses —Dstadrout (7 bits) and Dstadrin (7 bits). The general strategy is that the instruction sequencer (IS) broadcasts both the opcode and the destination operand address to all coprocessors simultaneously. The destination operand address is broadcast on the Dstadrout bus. The coprocessor latches this address, executes the instruction, and before returning the result on the destination bus drives the Dstadrin bus with this same address. The Dstadrin bus is a precharge bus which the RF latches and decodes for the destination operand's address.

Along with the Dstadrin bus there is a single line, Wr64bit. This signal is driven by coprocessors to the RF when returning a 64 bit value (instead of a 32 bit value). The EU drives this line only when executing either a "movl" or "mov-add-64" instruction. This signal is also a precharged signal.

The Wr64bit is not broadcast with the Dstadrout. It is determined solely from the opcode. Thus, it follows that the register file must also be able to detect all instructions which return 64 bit values so that appropriate scoreboard bits may be set.

Opcode (and OpcodeL)

The opcodes for instructions can be up to 12 bits long. Of those, 8 bits represent opcodes in one of the four instruction formats: REG, MEM, COBR, CTRL. The coprocessors only execute the REG format instructions which represent ¼ of the opcode space. Thus, of these 8 bits the instruction sequencer only broadcasts 6 bits to the coprocessors on the "opcode" bus; the REG format instruction type on this bus is implied. Four other bits further decode instructions within the REG format space. They are broadcast on the "opcodel" lines. Both "opcode" bus and the "opcodel" bus are precharged buses.

Scbok

This signal is both an input and an output signal to the EU (4).

In pipe stage 1, phase 2, Scbok line (102) is an input as far as the EU is concerned. If it is pulled low at this time it indicates that either a resource that the EU needs is not free (ie. a register to be used as destination) or that another single cycle coprocessor has faulted or needs an assist. In either case the EU does not execute its instruction.

In pipe stage 2, phase 2, Scbok (102) is an output as far as the EU is concerned. Scbok is pulled low by the EU in case of an EU fault or event but the current operation the EU is performing continues to completion. Pulling Scbok at this stage stops execution of the next instruction in the pipe and allows the instruction sequencer to start execution of the fault or event handler.

Cceuidq12 and Cceuidq22

This is a 3 bit bus on which the IS sends the condition codes (CCC) to the EU during pipe 1, ph2. The EU is the only unit which can modify the CCC. It does so (if necessary) during pipe 2, ph1 and returns the modified CCC to the IS during the following phase 2 - pipe2, ph2. The Cceuidq22 is the 3 bit bus on which the CCC is returned.

Euwrite

This signal is part of the coprocessor arbitration logic. Since all coprocessors must return results to the register file via the destination bus, the coprocessors must arbitrate for this bus. The EU unit is considered to be the highest priority coprocessor. As such the EU uses the destination bus when needed without waiting. The Euwrite signal is a principle part of the coprocessor arbitration scheme. It is generated by the EU when it needs the destination bus and is broadcast to all other coprocessors to prevent them from using the bus at the same time. In general all other coprocessors that want to return results must wait for slots where the EU is NOT using the bus.

FIG. 4 shows the timing for the EU. All coprocessors instructions are pipelined. The opcode (112) is broadcast by the IS in the ID (8) to all coprocessors along with the destination operand's address (120) during pipe 1, ph1. (Both the opcode/opcodel and the Dstadrout buses are precharged every ph2 and driven during ph1.) This information is latched by all coprocessors (2, 4, etc.). Instructions are decoded and source operands are driven and held on the Src1/Src2 buses during pipe 1, ph2. During this pipe stage Scbok (102) is also checked by the coprocessor which is to execute the instruction. If it is low it indicates that: (1) One or more of the resources needed to complete the instruction (ie. Src1, Src2, Dst registers) is not available because another instruction which is still executing is using that resource. In this case Scbok is pulled low by the RF (2) Another single-cycle coprocessor (coprocessor "B") has faulted or requested an assist and pulls Scbok low. In this case "B" pulls Scbok to prevent other processors from using its result data which may be incorrect but may be needed by the next instruction.

If any one of the above cases occur the coprocessor is prohibited from continuing the execution of the present instruction —it leaves all state information unchanged and does not drive any of the address or data buses. If case 1 occurs the instruction is rescheduled by the IS and is rebroadcast at the next ph1. If case 2 occurs the IS jumps to a fault/assist routine.

Where a generic coprocessor may take an unlimited number of cycles to execute its instruction, the EU in all cases just requires 1 phase for instruction execution - pipe 2, ph1. The timing diagram of FIG. 3 shows the data path control lines setting up during pipel, ph2. They are static during the execution of the instruction the following ph1. The result of the operation is latched during the instruction execution phase and held through the following ph2 when the result is driven on the Dst bus.

In general, coprocessors can hold results while they arbitrate among themselves for the Dstadrin and Dst buses to return a result. This is not true of the EU. The EU contains no hardware in which to hold results for more than a cycle. Thus, it must return the result during pipe 2, ph1. To assure that it has access to the Dstadrin address bus and the Dst bus, the EU asserts the Euwrite line on any operation which requires that EU return a result to a register. The Euwrite along with Scbok indicate to other processors whether they can use the Dstadrin address bus during pipe2, ph1 and the Dst bus during pipe 2, ph2. Specifically, another coprocessor can drive the Dstadrin and Dst buses as long as both Euwrite and Scbok are not both high. Euwrite low/Scbok high indicates that the EU does not need the bus. This is a "go ahead" for another coprocessor to use the bus. Euwrite high/Scbok low indicates that although the EU intended to use the bus it was inhibited because of lack of a resource or because of another single-cycle coprocessor fault. In either case the EU will not use the Dstadrin bus nor the Dst bus during the next cycle; thus, it is free to be used by another coprocessor.

While the invention has been particularly shown and described with reference to preferred embodiments thereof, it will be understood by those skilled in the art that the foregoing and other changes in form and detail may be made therein without departing from the scope of the invention.

What is claimed is:

1. In a data processor connected to a main memory and a microinstruction bus for carrying a current microinstruction including an opcode field, said data processor including single cycle coprocessors and multi-cycle processors, a resource scoreboarder comprising:

a register array (18) comprised of a plurality of registers;

said array including busy bits associated with each register in said array;

a Scbok line (102) connected to said register array and to first ones of said single cycle coprocessors and multi-cycle processors, said scbok line when driven to a first state, indicating that a first particular register of said plurality of registers or a single cycle coprocessor or a multi-cycle processor used by a current register type of microinstruction on said microinstruction bus is available for a register execution operation and, when driven to a second state, indicating that said first particular register or said single cycle coprocessor or said multi-cycle processor used by said current register type of microinstruction on said microinstruction bus is not available for a register execution operation:

said Scbok line being initially driven to said first state;

first means (204) connected to said register array for checking said first particular register needed to execute said microinstruction to determine if said first particular register is busy;

second means (218) connected to said microinstruction bus for checking said opcode field of said microinstruction to determine if said microinstruction is a single cycle microinstruction, and, third means (220) connected to said first means, said second means, and to said scbok line, for driving said Scbok line to said second state upon the condition that said microinstruction is a single cycle microinstruction and that said first particular register needed by said single cycle microinstruction is busy.

2. The resource scoreboarder as in accordance with claim 1 further comprising:

a Mem Scbok line (100) connected to said register array, to said main memory and to second ones of said single cycle coprocessors and multi-cycle processors, when driven to a first state, indicating that a second particular register in said array used by a current memory type of microinstruction on said microinstruction bus is busy, and when driven to a second state indicating that said second particular register in said array or a single cycle coporcessor or a multi-cycle processor used by a current memory type of microinstruction on said microinstruction bus is not busy;

said Mem ScbOK line (100) being initially driven to said first state; and, fourth means (216) connected to said first means, said second means, and to said mem scbok line, for driving said mem Scbok line to said second state upon the condition that said microinstruction is a multi-cycle micro instruction and that said second particular register needed by said multi-cycle microinstruction is busy.

3. A data processor connected to a main memory and a micorinstruction bus for carrying a current microinstruction, said current micro instruction including source operands, said data processor including a register array comprised of a plurality of registers; said array including busy bits associated with each register in said array, said data processor including single cycle coprocessors and multi-cycle processors, the method comprising the steps of:

A. driving a Scbok line (102) to a first state to signal that said current microinstruction on said microinstruction bus is valid;

B. driving information from said array on a machine bus during a first phase of a first clock cycle;

C. reading said source operands of said current microinstruction during a second phase of said first clock cycle;

D. checking said busy bits of all registers needed by said source operands to execute said current microinstruction;

E. driving said Scbok line to a second state during said second phase of said first clock cycle upon the condition that any one of said registers needed by said microinstruction is marked busy or a single cycle coprocessor or a multi-cycle processor used by a current register type of microinstruction on said microinstruction bus is unavailable for a register execution operation;

F. reissuing said current microinstruction during a clock cycle subsequent to said first clock cycle upon the condition that said Scbok line is driven to said second state.

4. The method in accordance with claim 3 further comprising the steps of:

G. marking destination registers of said current microinstruction "busy" upon the condition that said current microinstruction is a multi-cycle instruction; and, H. driving said Scbok line to said second state immediately after said microinstruction appears on said microinstruction bus upon the condition that said current microinstruction requires a register that has been marked "busy".

5. A data processor, said data processor including single cycle coprocessors and multi-cycle processors, said data processor connected to a main memory and a microinstruction bus for carrying a current microinstruction, said current microinstruction including an opcode field, said data processor including:

a resource scoreboarder; and, a register array (18) comprised of a plurality of registers;

said register array including scoreboard bits associated with each of said plurality of registers in said array, a method comprising the steps of:

A. driving a Scbok line (102) to a first state to indicate that a register or a single cycle or multi-cycle coprocessor used by a current register type of microinstruction on said microinstruction bus is available for a register execution operation;

B. checking (204) said busy bits of all registers needed to execute said microinstruction to determine if they are all available;

C. checking (218) said opcode field of said microinstruction to determine if said microinstruction is a single cycle microinstruction or a multi-cycle microinstruction, and, D. driving (220) said Scbok line to a second state upon the condition that said microinstruction is a single cycle and that a register or a single cycle coprocessor or a multi-cycle processor needed by said microinstruction is busy.

6. The method in accordance with claim 5 further comprising the step of:

E. driving a Mem ScbOK line (100) to a first state to indicate that a register in said array used by a current memory type of microinstruction on said microinstruction bus is available; and, F. driving (216) said mem Scbok line to a second state upon the condition that a register or a single cycle coprocessor or a multi-cycle processor needed by the microinstruction is busy.

* * * * *